United States Patent
Brooks (10) Patent No.: US 8,603,332 B2
(45) Date of Patent: Dec. 10, 2013

(54) METHOD OF CONSTRUCTING SEPTIC SYSTEM INCLUDING PIPE SUPPORT

(76) Inventor: William R. Brooks, Boyne City, MI (US)

( * ) Notice: Subject to any disclaimer, the term of this patent is extended or adjusted under 35 U.S.C. 154(b) by 0 days.

(21) Appl. No.: 13/331,293

(22) Filed: Dec. 20, 2011

(65) Prior Publication Data

US 2012/0087728 A1    Apr. 12, 2012

Related U.S. Application Data

(63) Continuation of application No. 12/025,320, filed on Feb. 4, 2008.

(51) Int. Cl.
  *C02F 1/00*      (2006.01)
  *E02B 15/00*    (2006.01)
  *F16L 1/00*      (2006.01)
  *F16L 55/00*    (2006.01)
  *E21F 17/02*    (2006.01)

(52) U.S. Cl.
  USPC ........ 210/170.08; 138/105; 138/108; 248/58; 248/62; 248/70

(58) Field of Classification Search
  USPC .......... 138/105, 108, 112; 248/49, 58, 59, 62, 248/70, 71, 74.3, 74.4, 75, 80, 96; 52/678, 52/687; 210/170.08
  See application file for complete search history.

(56) References Cited

U.S. PATENT DOCUMENTS

| | | | |
|---|---|---|---|
| 1,058,908 A | 4/1913 | Schoenthaler | |
| 1,060,919 A | 5/1913 | Luten | |
| 2,937,833 A * | 5/1960 | Sachs | 248/49 |
| 3,495,410 A * | 2/1970 | Bailey et al. | 405/46 |
| 4,268,189 A | 5/1981 | Good | |
| 4,759,661 A | 7/1988 | Nichols et al. | |
| 5,017,041 A | 5/1991 | Nichols | |
| 5,156,488 A | 10/1992 | Nichols | |
| 5,336,017 A | 8/1994 | Nichols | |
| 5,367,127 A * | 11/1994 | Dormon | 174/146 |
| 5,401,116 A | 3/1995 | Nichols | |
| 5,401,459 A | 3/1995 | Nichols et al. | |

(Continued)

FOREIGN PATENT DOCUMENTS

| | | |
|---|---|---|
| CA | 1329959 | 5/1994 |
| CA | 2004564 | 9/1995 |

OTHER PUBLICATIONS

Exhibit A is a brochure entitled, "Infiltrator Chamber Systems Catalog," Copyright 2006.

*Primary Examiner* — Ryan Reis
(74) *Attorney, Agent, or Firm* — Price Heneveld LLP (57) ABSTRACT

A method includes placing pipe stands to support waste-conveying pipes in a trench in a septic system. The pipe stands are preferably flat bowtie-shaped sheets (preferably polymeric) folded to form stable pipe supports. Holes or notches are formed that align when the sheet is folded, thus providing stable support for a horizontal pipe when the panels' bottom edges rest on the ground. Modified versions include: folding a fold-out foot in the panels for engaging soft soil, forming fold-out dispersing flanges for dispersing waste dropped from the pipe, driving stakes into soft soil for stability, punching-out rings or multiple holes for supporting different sized pipes, stabilizing opposing panels in the sheet to fixedly maintain their spacing, forming a feature for receiving a grounded wire stake, and/or providing a bias from the living hinge of the fold line causing frictional gripping of the pipe. Many versions can be used in different orientations.

6 Claims, 5 Drawing Sheets

(56) References Cited

U.S. PATENT DOCUMENTS

| | | |
|---|---|---|
| 5,511,903 A | 4/1996 | Nichols et al. |
| 5,588,778 A | 12/1996 | Nichols et al. |
| 5,716,163 A | 2/1998 | Nichols et al. |
| 5,839,844 A | 11/1998 | Nichols et al. |
| 6,076,780 A | 6/2000 | Honnecke et al. |
| 6,076,993 A * | 6/2000 | Gray ............................. 405/43 |
| 6,644,604 B1 | 11/2003 | Young |
| D565,389 S | 4/2008 | Harmon |

* cited by examiner

METHOD OF CONSTRUCTING SEPTIC SYSTEM INCLUDING PIPE SUPPORT

CROSS REFERENCE TO RELATED APPLICATION

This application is a continuation of U.S. patent application Ser. No. 12/025,320 filed on Feb. 4, 2008, entitled PIPE STAND, the entire contents of which are incorporated herein by reference.

BACKGROUND

The present invention relates to pipe stands, and more particularly relates to pipe stands used to support liquid-filled horizontally-extending pipes supported in a trench above ground, such as are used to convey human waste to drain fields of septic systems, though not limited to only that use.

One type of septic system (sold by Infiltrator Systems, Inc., Old Saybrook, Conn., by Chamber Systems ADS Company, and also by Hancor Company) includes waste-conveying pipes supported above ground and that extend from a septic tank to a drain field. The pipes are positioned in trenches in the ground, and supported under semi-cylindrical chambers, such as by tying the pipes to the chambers by straps or by supporting the pipes on posts that extend into the ground at a bottom of the trenches. In a gravity system, the waste-conveying pipes are generally horizontal but slightly downhill, such that the waste flows from the septic tank by gravity to a dump location in the drain field. In a low pressure system, the waste is communicated under pressure through waste pipes that define several dump locations in the drain field. Both systems require that the waste-conveying pipes be stably supported above the ground in a horizontal position so that low sections are avoided, both at installation and also over time. The avoidance of low sections prevents solid waste from collecting in low sections and thus prevents the collecting waste from stopping flow through the pipe. However, known pipe supports for the above-discussed septic system are deficient in that they require a difficult installation and also they may allow the pipe to sag and form low sections prematurely over time. For example, one system preassembles the pipe to the chambers using tie straps, and then places the pipes and chambers as a unit.

Specifically, the two most common ways of supporting waste-conveying pipes in the above-mentioned septic system include either straps or posts, both of which have significant installation and durability problems. For example, it is difficult to attach straps under the chambers and difficult to assure that the pipes are held in a horizontal position under the chambers with no low sections, since vision and reach are difficult. Further, the straps may break or sag over time (especially since waste-filled pipes are heavy), causing low sections to occur well after the installation, thus requiring maintenance and/or repair. Posts can be installed before the chambers are placed in the trench, such that installation is a bit easier than straps. However, posts tend to tip sideways or sink (or erupt from ground pressure), such that there is a significant risk of low sections forming over time. Also, sometimes it is difficult to drive the posts into the ground deep enough in the location and true-vertical orientation desired.

SUMMARY OF THE PRESENT INVENTION

In one aspect of the present invention, a method of constructing a septic system comprising steps of providing a trench and at least one long section of waste-conveying pipe with apertures therein, providing a plurality of pipe stands, each including at least one panel with a pipe-supporting surface and an edge adapted to stably engage a ground surface, and positioning the pipe stands transversely to the pipe and in a position supporting the pipe above a bottom of the trench, including slipping the pipe stands onto or under the waste-conveying pipe. The method further includes placing components forming an elongated chamber in the trench that at least partially cover the pipe above the bottom with the trench unfilled to form a septic system capable of handling and distributing waste product.

In another aspect of the present invention, a method comprises steps of digging a trench with a bottom, providing waste-dispensing pipe, forming a plurality of pipe stands from sheet material, and supporting the pipe above the bottom of the trench using the pipe stands, with the pipe stands engaging and supporting the pipe at spaced locations, the pipe stands each comprising a body having a pipe-supporting portion. The method further includes placing components forming an elongated chamber in the trench that at least partially cover the pipe above the bottom with the trench unfilled to form a septic system capable of handling and distributing waste product.

In still another aspect of the present invention, a septic system includes an unfilled trench with a bottom, a pipe system for spreading waste along the bottom of the unfilled trench, the pipe system including at least one apertured pipe for conveying and dropping waste located above the bottom, and a plurality of pipe stands supporting the pipe above the bottom of the unfilled trench, each pipe stand comprising a flat sheet having two interconnected panels that define a fold line therebetween so that, when folded along the fold line, the two panels align a pipe-supporting portion on each panel for receiving the pipe, the pipe-supporting portion being spaced above a bottom edge of the panels so that the at least one pipe can spread the waste along the bottom of the unfilled trench.

An object of the present invention is to provide a very simple pipe stand that is durable, long-lasting, and very stable when used to support waste-conveying pipes in the primary environment of a septic system.

An object of the present invention is to provide a pipe stand that promotes an efficient installation of a septic system, and which is intuitive to use, yet flexible in use.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
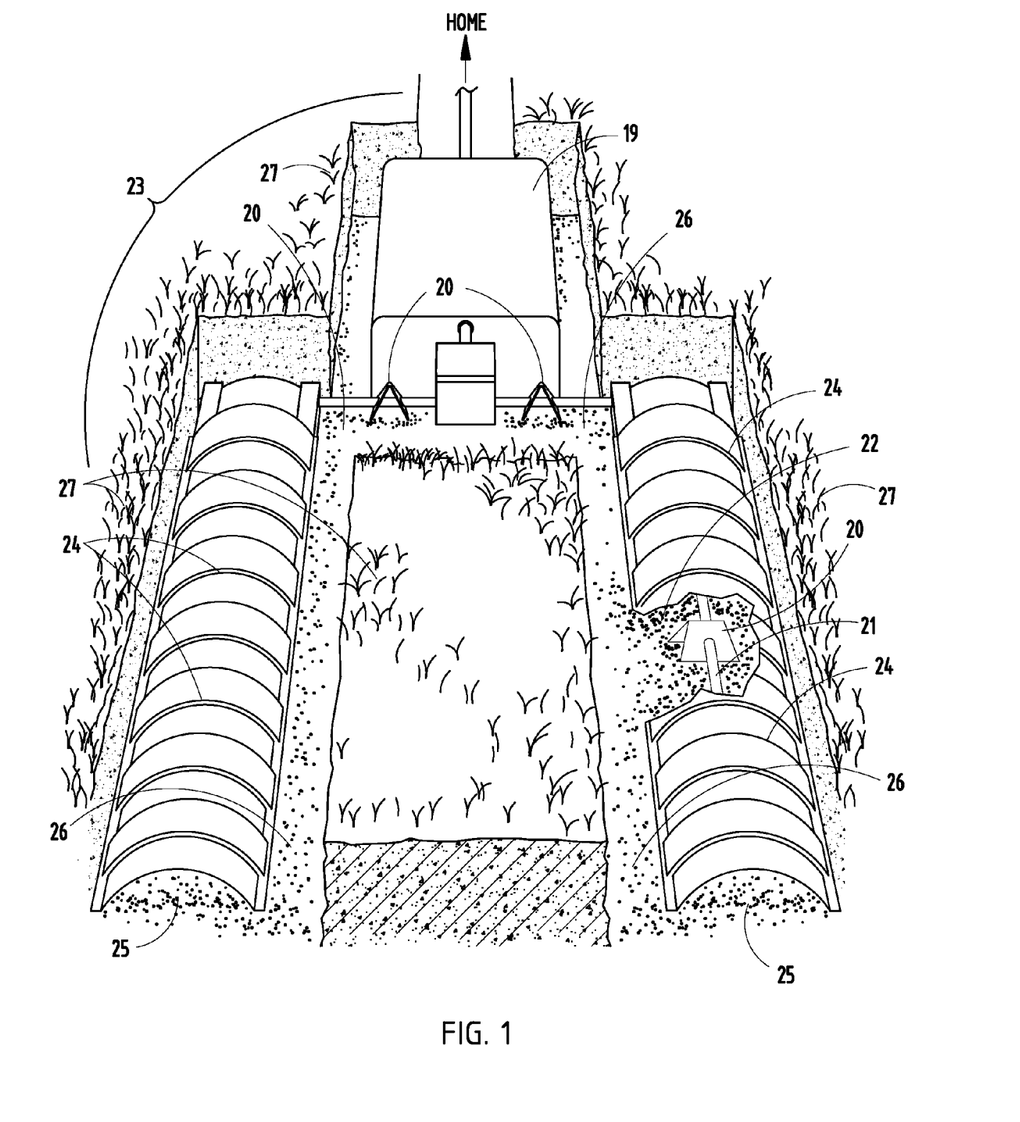
FIG. 1 is a perspective view of a septic system including the drain field, the drain field being uncovered so that components can be seen, one of the chambers being broken away to reveal the waste-conveying pipe as supported by a pipe support of the present invention.
Figure 2:
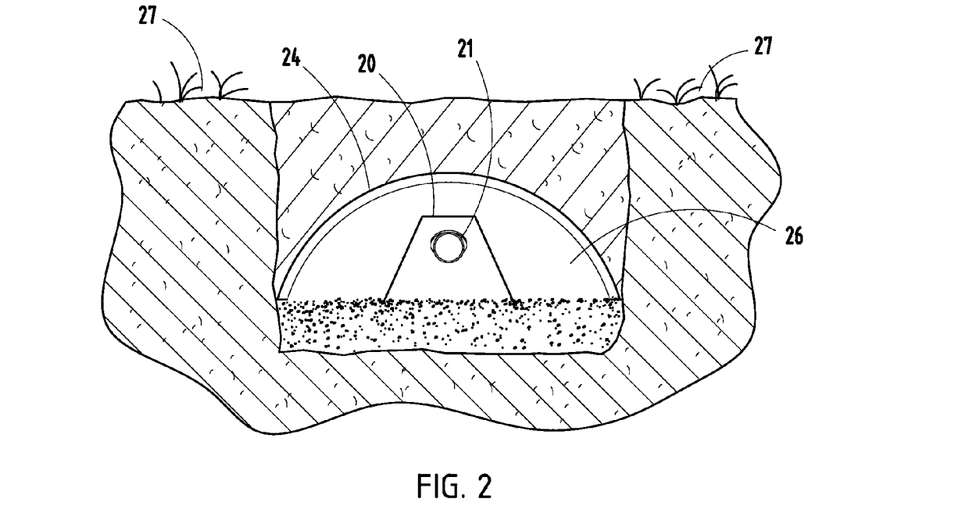
FIG. 2 is a cross section taken through a chamber in the drain field, showing the chamber, the pipe, and the pipe stand.
Figure 3:
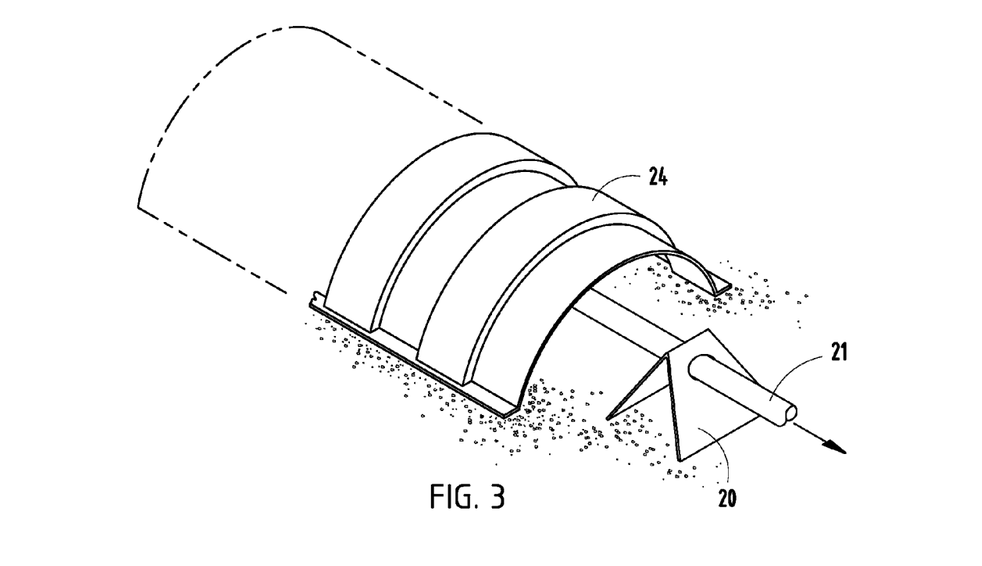
FIG. 3 is a perspective view showing a similar area and components.
Figure 4:
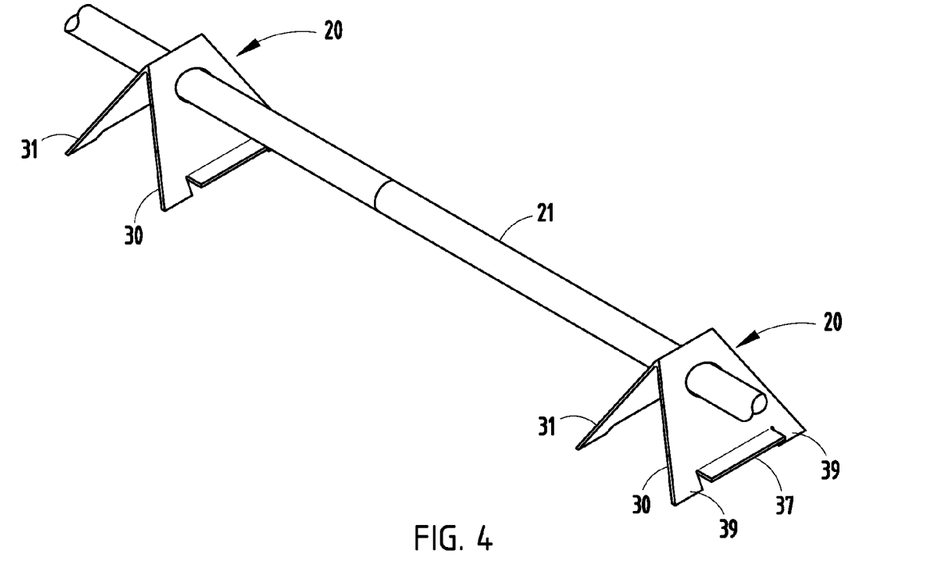
FIG. 4 is a perspective view of a long waste-conveying pipe section and with multiple pipe stands for supporting the pipe.

The present pipe stands 20 (FIGS. 1-4) support waste-conveying pipes 21 above a trench-bottom ground surface 22 in a septic system 23 having a septic tank 19. The illustrated septic system 23 includes semi-cylindrically-shaped chambers 24 that are positioned over the pipes 21 in the drain field 25 thereby defined. Notably, FIG. 1 illustrates the components 20, 21, and 24 as positioned in a bottom of trenches 26. These trenches 26 are filled during a later part of the installation to a level generally equal to the top soil 27, with the chambers 24 protecting the pipes 21 (and stands 20).

The present pipe stands 20 are particularly simple, effective, flexible in use, and easy to install in the present environment of a septic system for a variety of reasons. In regard to their construction, the pipe stand 20 (FIGS. 4-6) is cut from a flat bowtie-shaped sheet (preferably durable polymeric sheet such as high density polyethylene that is about ⅛" to ¼" thick, though it could be metal, aluminum, composite, or other structural material). The bowtie shape defines two panels 30 and 31 connected by a narrow region 32 (also called a "fold line" or a "living hinge"). The narrow region 32 of the "bow tie" shape, when folded, forms a living hinge that biases the panels 30 and 31 toward a more planar shape. The fold line can include slits or thinned areas to assist in folding, and to reduce the outward biasing force. This may be desirable when it is unnecessary for the panels 30 and 31 to frictionally engage the pipe 21. A hole 33 is formed in each panel slight larger than the pipe 21 that it is intended to receive, thus forming a pipe-supporting surface. The holes 33 align when the sheet is folded, thus providing a stable two-point support for a horizontal pipe 21. In stands where the panels 30 and 31 are biased apart, the stand 20 frictionally engages the pipe 21. This assists in installation by holding the stands in position on the pipe 21 while the pipe 21 is being manipulated to a final position. Advantageously, the pipe 21 does not have to be tied to the chamber 24 covering it.

Also, when attached to the pipe 21, each bottom edge 35 and 36 of the panels 30 and 31 rest on the ground. Due to a width of the edges 35 and 36, they stably engage the ground surface 22 even if there are some variations in the surface 22. A fold-out foot 37 is formed at the bottom edges 35 and 36 by pairs of slots 38. The fold-out foot 37 is useful where the ground is soft, since it can be bent to a horizontal position that gives a wider footprint along the bottom edge 35 and 36. At the same time, the end tabs 39 (outboard of the foot 37) extend into the soil of the ground surface 22, adding further stability to the arrangement.

Figure 5:
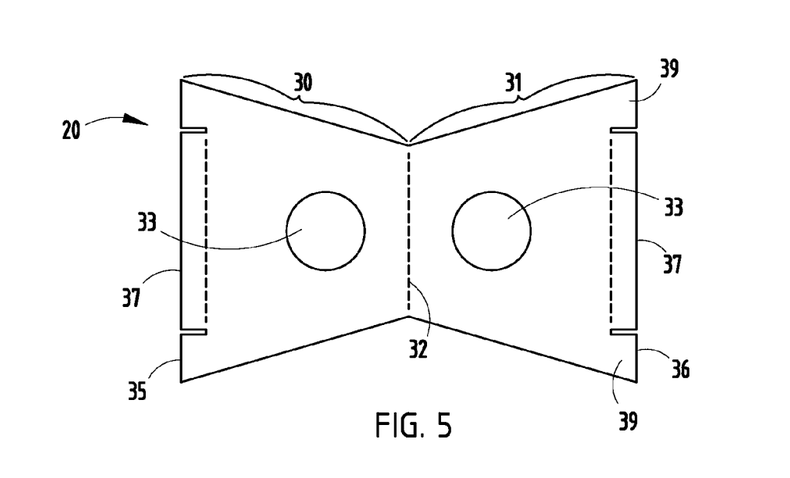
FIGS. 5-6 are plan and side views of a pipe stand blank prior to bending.
Figure 6:
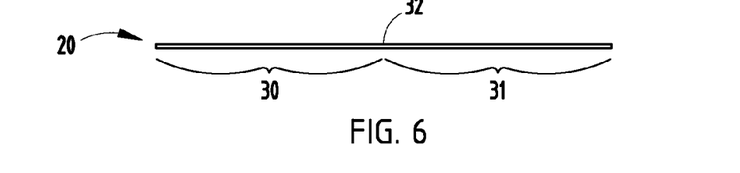
Figures 7, 8, 9:
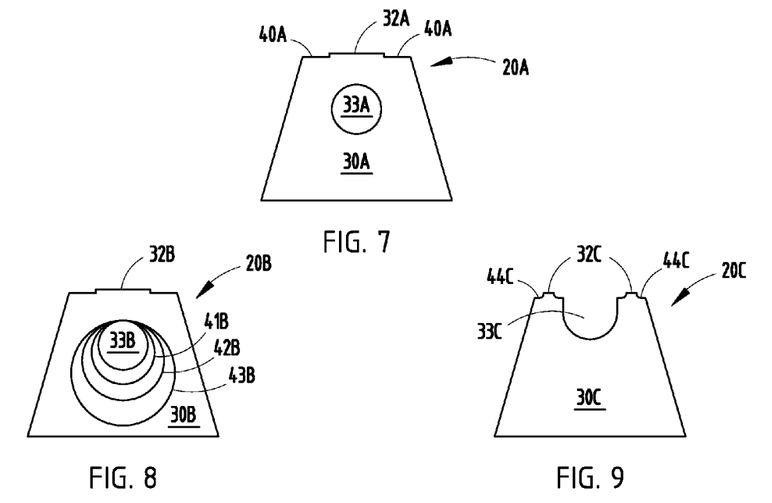
FIGS. 7-20 are perspective views of alternative pipe stand constructions, FIGS. 13 and 20 showing installations.
Figure 10:
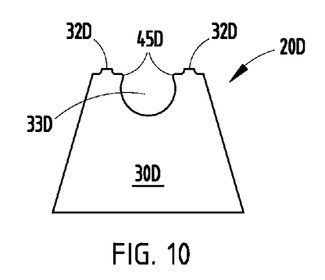
Figure 11:
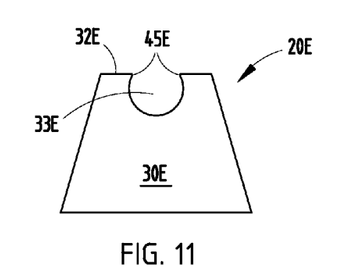
Figure 12:
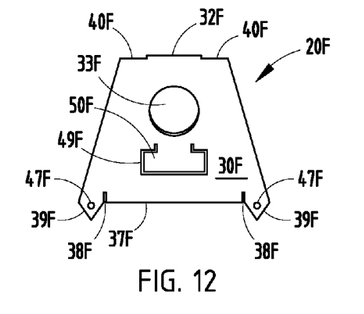
Figure 13:
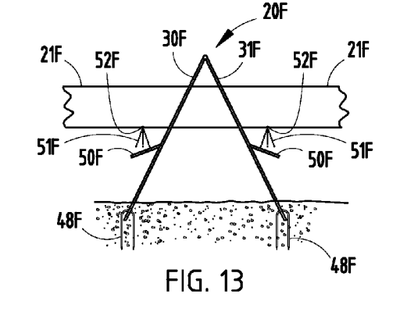
Figure 14:
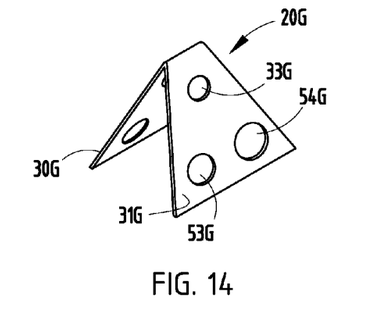
Figure 15:
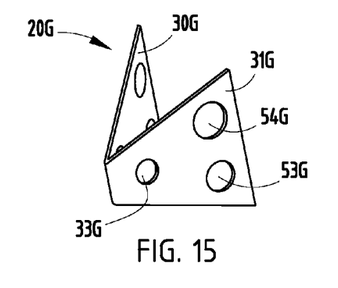
Figures 16, 17:
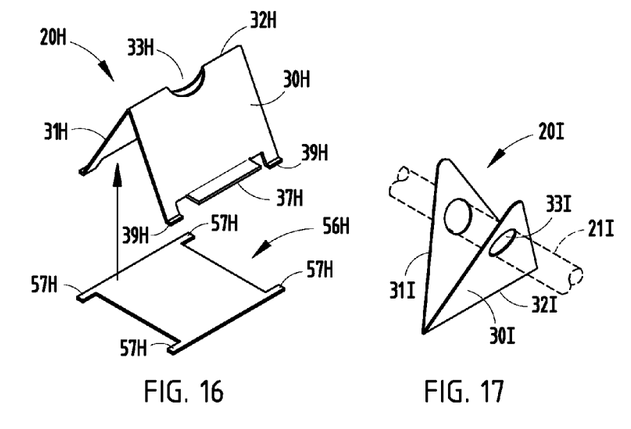
Figure 18:
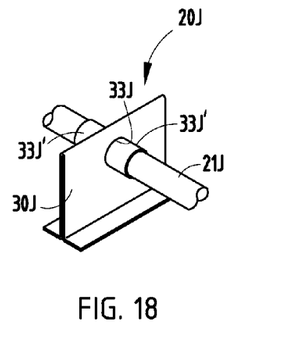
Figure 19:
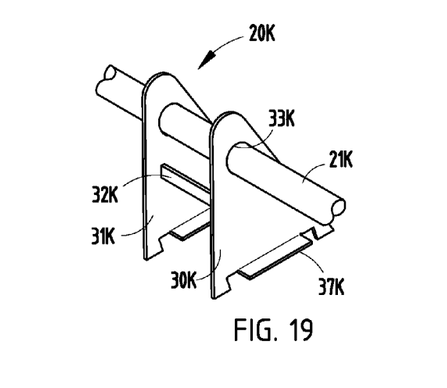
Figure 20:
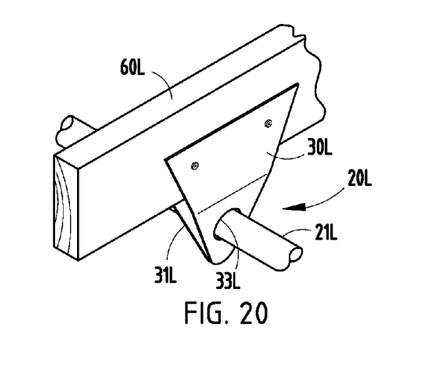

It is noted that variations can be made in the pipe stand 20 of FIG. 5-6. For example, pipe stand 20 can be used in a second orientation (i.e. rotated about 100 degrees on the pipe from the orientation shown in FIG. 2-3). In this second orientation, the pipe 21 is positioned slightly closer to the ground surface 22, thus giving the user a height selection capability. Also, the living hinge can be replaced with actual hinges or straps or tethers. Further, the material of the stand 20 can be any structural material, including metal (corrosion-treated steel, stainless steel, aluminum) composites, and other materials. The pipe stand 20 can be injection molded, stamped, CNC cut, saw and drilled, die-cut, water jet cut, routed, or shaped by other known methods.

A number of modified pipe stands are shown in FIGS. 7-20. In these modified pipe stands, similar and identical components, features and characteristics are identified using identical numbers to those used in FIGS. 1-6, but with the addition of a letter "A," "B," "C," etc. This is done to reduce redundant discussion. Notably, the various modified pipe stands include the same features and characteristics as the pipe stand 20 unless otherwise noted.

The pipe stand 20A (FIG. 7) is similar to pipe stand 20 except pipe stand 20A includes slots 40A at ends of the fold line 32A. This reduces an outward bias of the living hinge, thus making it easier to fold the sheet to form the pipe stand 20A and also reducing a grip of the pipe stand 20A on the pipe (21).

The pipe stand 20B (FIG. 8) includes a hole 33B and further includes a plurality of circular slits or depressions forming a plurality of punch-out rings 41B-43B of different sizes around the hole 33B. Each ring 41B-43B can be punched out to form a hole sized for a particular pipe (21), such as 1¼", 1½", 2", 3", etc.

The pipe stand 20C (FIG. 9) includes a notch 33C instead of a hole (33). The notch 33C opens toward the fold line 32C, thus reducing a strength of the living hinge at the fold line 32C. Also, there are slits 44C at outer ends of the fold line 32C, further weakening the bias of the living hinge. Notably, the edges of the notch 33C extend vertically, such that it engages a maximum of 180 degrees of the pipe (21). Note that pipe stands 20D (FIG. 10) and 20E (FIG. 11) include inwardly-facing tips 45D (rounded) and 45E (relatively pointed) at upper ends of their respective notches 33D and 33E. The tips 45D, 45E are made to resilient snappingly engage a pipe 21D, 21E pressed into the respective notch 33D or 33E. Thus, the pipe 21D, 21E is retained in the notch (33D, 33E) even though the notch 33D, 33E is upwardly open.

The pipe stand 20F (FIGS. 12-13) includes slots 40F at ends of its fold line 32F (similar to pipe stands 20A), which shorten its living hinge and the bias of its hinge. Slots 38F are formed to define a fold-out foot 37F. The illustrated end tabs 39F are pointed and stake-simulating, such that they dig into soft ground for retaining the panels 30F and 31F in position. Further, the tabs 39F include a small hole or other feature/structure 47F for receiving a U-shaped ground-engaging wire stake or pin 48F that fixedly holds the panels 30F and 31F in their respective selected positions.

A U-shaped slot 49F (FIGS. 12-13) is formed in the panels 30F and 31F, defining a fold-out dispersing flange 50F. In pressurized septic systems, the waste product 51F is pushed out openings 52F in the pipe 21F. When the waste product 51F is dispensed onto a dispersing flange 50F, the flange 50F spreads the waste product 51F and reduces an impact of the waste product 51F as it engages a particular area of the ground 22F.

The pipe stand 20G (FIG. 14) includes three holes 33G, 53G, and 54G, each sized to receive a different size diameter pipe (21). Each hole 33G, 53G, and 54G is located in a different corner of the pipe stand 20G. By positioning the pipe stand 20G in different orientations (compare FIGS. 14 and 15), different holes 33G, 53G, 54G can be positioned at a top of the stand 20G (i.e., at their preferred height). It is contemplated that more or less holes 33G, 53G, 54G could be used, and also that punch-out rings could be used in combination with multiple holes 33G, 53G, 54G. Also, it is noted that the living hinge of pipe stand 20G is located at a corner and that the panels 30G and 31G are triangularly shaped, such that the living hinge is relatively short without the need for cutting slots into the fold line 32G.

The pipe stand 20H (FIG. 16) includes a stabilizer panel 56H with corners having tabs 57H configured to frictionally engage the end tabs 39H. When engaged, the stabilizer panel 56H holds the panels 30H and 31H at a desired spacing, thus adding stability to the pipe stand 20H without the need for stability to come from the way that the holes 33 engage the pipe (21). Also, the stabilizer panel 56H adds considerably to the footprint of the pipe stand 20H, and can be particularly useful where the soil is particularly soft. Nonetheless, it is noted that care must be taken to not reduce the surface area of the ground surface, since a minimum amount of surface area is required in order to qualify as a drain field for a given septic system.

The pipe stand 20I (FIG. 17) includes two triangular panels 30I and 31I connected by a relatively long fold line 32I. As noted above, the fold line 32I can be made easier to fold if necessary, such as by adding perforations, slits, slots, or thinned areas along the fold line 32I. As illustrated, the holes 33I are located near the outer corners of the triangular panels 30I and 31I. When folded, the long fold line 32I is positioned at the ground, with the pipe 21I engaging the holes 33I at a selected height above the ground and fold line 32I. Notably, in previous illustrated pipe stands, the fold line was along a top (or side) of the part. In pipe stand 20I, it is located along its bottom.

The pipe stand 20J (FIG. 18) includes a panel-shaped structural member 30J of sufficient strength to support a pipe 21J in an elevated position above a ground surface 22J, and includes a pipe receiving feature (hole 33J and potentially within the hole 33J a short pipe 33J' large enough to receive pipe 21J) and a ground-engaging stabilizer (foot 37J) of sufficient width to prevent tip-over. The foot 37J can be integrally formed as part of the structural member 30J (and folded outwardly therefrom), or can be a separately formed part attached along a bottom edge of the panel-shaped structural member 30J.

The pipe stand 20K (FIG. 19) includes a pair of panel-shaped structural members 30K and 31K connected by transverse rib 32K from their bottom and connected by pipe 21K at their top, where the pipe 21K is extended through closely fitting holes 33K.

The pipe stand 20L (FIG. 20) is similar to pipe stand 20, and includes two panels 30L and 31L connected at their narrow section (fold line 32L). The pipe 21L is extended through holes 33L. However, the pipe stand 20L is inverted so that panels 30K and 31K can be attached to an overhead beam, such as a ceiling beam or floor joist 60K. Thus, the present pipe stand is converted into a pipe hanger. This same concept of inverting the component and using it as a hanger can be done using any of the pipe stands shown in FIGS. 6-8, 10-12, 18-19.

Advantageously, the present pipe stands can be used in low pressure chamber systems, and do not have to be tied to a chamber. This allows the chamber to be installed after the "squirt" test. The present stands are easily installed, including folding and sliding onto the pipe that they support. They ship flat and are low weight, such that they ship at low cost, and are easily shipped and stored. They are easily adjustable to different spacings on a given pipe. Notably, different pipe sizes require different spacings, and the present pipe stands readily fill that need, while providing excellent stability and levelness of the pipe off the ground. In some forms, the pipe stands squeeze the pipe, yet release for adjustment. Some pipe stands cradle and/or snap over the pipe for additional sureness of retention. Others have punch-outs that permit selection of a desired hole size. The present pipe stands are independent from the chamber, and stand alone. They fit multiple sizes of pipes, with holes on one pipe stand fitting more than just one pipe size. Sides of the pipe stands can be fixed in a desired spread condition, either by using a cross piece, or ground-engaging tabs. Further, the sides of the pipe stands can include fold-out feet for increased footprint for loose soil, and also can include fold-out flanges for dispersing waste material dropping from the pipe. The pipe stands include integral hinges that are low-cost, easily bent to a desired shape, and ARE highly efficient and satisfactory for their intended purpose. The pipe stands can be inverted and used as a pipe hanger. They can be made by a variety of processes, such as injection molding, stamping, cutting, forming, sawing/drilling, and the like. They can be made out of many different materials, such as plastic, metal (steel, aluminum) composite, or the like. The present pipe stands can be made to virtually any size or shape, with any desired hole size.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method of constructing a septic system comprising steps of:
   providing a trench;
   providing a long section of waste-conveying pipe with apertures therein;
   providing a plurality of pipe stands, each being made from a sheet folded to form two interconnected panels connected by a living hinge with the living hinge biasing the panels toward a less angled position, the panels each including a pipe-receiving hole that aligned with the other pipe-receiving hole and an edge adapted to stably engage a ground surface;
   placing the pipe stands on the pipe with the living hinge causing the pipe stands to frictionally engage and hold a desired position on the pipe;
   manipulating and positioning the pipe and pipe stands as an assembled unit in the trench in a position supporting the pipe above a bottom of the trench;
   placing chambers over the pipe and pipe stands to prevent dirt from covering the pipe and pipe stands; and
   filling the trench without filling the chambers so that waste can flow from the pipes to a bottom of the trench without undesired restriction.

2. The method defined in claim 1, including forming a slot along the fold line to thus form a pair of living hinges, one on each side of the slot.

3. The method defined in claim 1, including forming a fold-out foot and ground-engaging tabs on each of the two panels with the tabs extending into loose soil in the bottom of the trench and the foot giving a wider footprint on the loose soil along a bottom edge of the panels.

4. The method defined in claim 1, including forming on each pipe stand at least one downwardly pointed integrally formed stake-simulating tab for engaging the ground surface.

5. A method comprising steps of:
   digging a trench with a bottom;
   providing waste-dispensing pipe with apertures therein;
   forming a plurality of pipe stands from sheet material with each pipe stand being made from a sheet folded to form two interconnected panels connected by a living hinge with the living hinge biasing the panels toward a less angled position;
   assembling the pipe stands on the pipe by extending the pipe through pipe-receiving holes and then releasing the panels of the pipe stands so that the living hinge locks the pipe stands in a desired position;
   manipulating and then placing the pipe and pipe stands as an assembled unit into the trench to thus support the pipe above the bottom of the trench using the pipe stands, with the pipe stands engaging and supporting the pipe at spaced locations; and placing components forming an elongated chamber in the trench to form a chamber over the pipe and then filling a remainder of the trench to form a septic system capable of handling and distributing and treating waste product.

6. A septic system comprising:

an unfilled trench with a bottom;

a pipe system for spreading waste along the bottom of the unfilled trench, the pipe system including an apertured pipe for conveying and dropping waste located above the bottom; and a plurality of spaced-apart pipe stands assembled to the apertured pipe, each pipe stand being made from a sheet folded to form two interconnected panels connected by a living hinge with the living hinge biasing the panels toward a less angled position, thus causing the panels to frictionally engage and lock onto the pipe when placed on the pipe and released, the panels each including a pipe-receiving hole that aligns with the other pipe-receiving hole, such that when placed on the pipe, the pipe stands lock onto the pipe and can be handled as a single unit, thus facilitating manipulation and installation where the pipe stands end up supporting the pipe above the bottom of the unfilled trench so that the pipe can spread the waste along the bottom of the unfilled trench.

* * * * *